United States Patent
Manadhata et al.

(10) Patent No.: US 11,563,754 B2
(45) Date of Patent: Jan. 24, 2023

(54) CYBER ATTACK PREDICTION BASED ON DARK IP ADDRESS SPACE NETWORK TRAFFIC TO PLURAL CLIENT NETWORKS

(71) Applicant: ENTIT Software LLC, Sanford, NC (US)

(72) Inventors: Pratyusa K. Manadhata, Piscataway, NJ (US); Martin Arlitt, Calgary (CA)

(73) Assignee: MICRO FOCUS LLC, Santa Clara, CA (US)

( * ) Notice: Subject to any disclaimer, the term of this patent is extended or adjusted under 35 U.S.C. 154(b) by 803 days.

(21) Appl. No.: 16/284,884

(22) Filed: Feb. 25, 2019

(65) Prior Publication Data
US 2020/0274886 A1    Aug. 27, 2020

(51) Int. Cl.
 *H04L 9/40*    (2022.01)

(52) U.S. Cl.
 CPC ...... *H04L 63/1416* (2013.01); *H04L 63/0421* (2013.01); *H04L 63/1441* (2013.01); *H04L 63/0428* (2013.01)

(58) Field of Classification Search
 CPC ............. H04L 63/1416; H04L 63/0421; H04L 63/1441; H04L 63/0428; H04L 63/1425
 See application file for complete search history.

(56) References Cited

U.S. PATENT DOCUMENTS

| | | | | |
|---|---|---|---|---|
| 8,413,238 B1 * | 4/2013 | Sutton | ................. | H04L 63/1441 709/224 |
| 8,560,413 B1 * | 10/2013 | Quarterman | ........ | H04L 63/1483 705/38 |
| 8,898,788 B1 * | 11/2014 | Aziz | ................... | H04L 63/1491 726/23 |
| 8,978,136 B2 | 3/2015 | Day | | |
| 9,356,942 B1 * | 5/2016 | Joffe | ....................... | H04L 43/10 |
| 2004/0117640 A1 * | 6/2004 | Chu | ..................... | H04L 63/145 713/188 |
| 2006/0101515 A1 * | 5/2006 | Amoroso | ................ | H04L 43/00 726/23 |
| 2008/0162592 A1 * | 7/2008 | Huang | .................. | G06F 21/552 |
| 2015/0264078 A1 * | 9/2015 | Beauchesne | ........ | H04L 63/1441 726/23 |

(Continued)

FOREIGN PATENT DOCUMENTS

| | | |
|---|---|---|
| CN | 108737385 | 11/2018 |
| JP | 2017034449 | 2/2017 |

OTHER PUBLICATIONS

Fachkha et al., Investigating the Dark Cyberspace: Profiling, Threat-Based Analysis and Correlation, Oct. 2012, 7th International Conference on Risks and Security of Internet and Systems, pp. 1-8 (Year: 2012).*

(Continued)

*Primary Examiner* — Kenneth W Chang
(74) *Attorney, Agent, or Firm* — Michael Dryja (57) ABSTRACT

A service receives, from client computing devices of client networks, information regarding incoming network traffic addressed to dark Internet Protocol (IP) address spaces the of client networks. The service can predict a cyber attack based on the information received from the client computing devices of the client networks. The server computing device notifies the client computing device of each client network affected by the predicted cyber attack.

20 Claims, 8 Drawing Sheets

(56) References Cited

U.S. PATENT DOCUMENTS

| | | | | |
|---|---|---|---|---|
| 2016/0028763 | A1* | 1/2016 | Cruz Mota | H04L 63/1458 726/23 |
| 2016/0119365 | A1 | 4/2016 | Barel | |
| 2017/0026387 | A1* | 1/2017 | Vissamsetty | H04L 63/08 |
| 2018/0324193 | A1* | 11/2018 | Ronen | H04L 63/1416 |

OTHER PUBLICATIONS

Fachkha, C., "Darknet as a Source of Cyber Threat Intelligence: Investigating Distributed and Reflection Denial of Service Attacks", Dec. 2015, <https://www.researchgate.net/publication/305827339_Darknet_as_a_Source_of_Cyber_Threat_Intelligence_Investigating_Distributed_and_Reflection_Denial_of_Service_Attacks>.

"Anomaly Detection of Network-wide Traffic", Genie Networks Ltd., Aug. 2014, <http://www.genie-networks.com/wp-content/uploads/2018/03/GenieATM_WP_ATD_v5.6_ENG.pdf>.

Shimoda, A. et al., "Virtual Dark IP for Internet Threat Detection", 2008, Waseda University2, <https://apan.net/meetings/xian2007/publication/017_Shimoda.pdf>.

Ahmed, E., "Monitoring and Analysis of Internet Traffic Targeting Unused Address Spaces", May 2010, Queensland University of Technology, <https://eprints.qut.edu.au/34075/1/Ejaz_Ahmed_Thesis.pdf>.

"Intelligence Enables Action Against Cyber Threats", Crowdstrike, retrieved from web Nov. 16, 2018, <https://crowdstrike.com/solutions/threat-intelligence-solutions/.

"Transfer Learning: Repurposing ML Algorithms from Different Domains to Cloud Defense", RSA Conference, Apr. 2018, <https://www.rsaconference.com/events/us18/agenda/sessions/11539-Transfer-Learning-Repurposing-ML-Algorithms-from-Different-Domains-to-Cloud-Defense>.

Vanjani et al., "Monitoring Darknets for Detecting Malicious Activities", Indian Institute of Technology, Kanpur Kanpur, India, 2017, <http://home.iitk.ac.in/~nihkilv/cs396a/pres.pdf>.

* cited by examiner

CYBER ATTACK PREDICTION BASED ON DARK IP ADDRESS SPACE NETWORK TRAFFIC TO PLURAL CLIENT NETWORKS

BACKGROUND

A significant if not the vast majority of computing devices are globally interconnected to one another via the Internet. While such interconnectedness has resulted in services and functionality almost unimaginable in the pre-Internet world, not all the effects of the Internet have been positive. A downside, for instance, to having a computing device potentially reachable from nearly any other device around the world is the computing device's susceptibility to malicious cyber attacks that likewise were unimaginable decades ago.

DETAILED DESCRIPTION

As noted in the background, a large percentage of the world's computing devices can communicate with one another over the Internet, which while generally advantageous renders the computing devices susceptible to cyber attack. For computing devices to communicate with one another over the Internet, they are temporarily or permanently assigned Internet Protocol (IP) addresses, which permits data packets to be appropriately routed to their destination. An IP address space is a contiguous set of IP addresses, or one or more sets of contiguous IP addresses.

When the Internet was first created, different entities, such as private businesses as well as governmental organizations, were assigned relatively large IP address spaces encompassing large swaths of contiguous IP addresses. Within any given IP address space assigned to an entity, the likelihood that all IP addresses within the address space are being actively used by the entity is low. Therefore, an IP address space can be effectively divided into two sets: an in-use IP address space of IP addresses that the entity is currently using and an unused IP address space of IP addresses that the entity is not currently using.

The IP addresses of both of these spaces are publicly (i.e., globally) routable over the Internet, in that packets can specify the IP addresses as their destinations such that the packets can reach the destinations from other networks or devices communicatively connected to the Internet. The difference is that in-use IP addresses are connected to computing devices, like servers, that are actively using the addresses, such as to provide various services. By comparison, unused IP addresses are not connected to computing devices that are actively using the addresses, and no legitimate services are provided at these addresses.

The unused IP address space of unused, but routable, IP addresses can be referred to as a dark IP address space. An entity holds its dark IP address space(s) in reserve, for future network expansion, at which time the dark IP address space becomes an in-use IP address space. Any network traffic routed to an IP address within a dark IP address space is likely malicious or erroneous, since no computing device is using the address to provide a network service or for any other reason.

Therefore, monitoring network traffic to dark IP address spaces can be beneficial as a way to predict impending cyber attacks. For example, a malicious actor may scan contiguous IP address spaces looking for open or insufficiently protected servers, through which the actor can instigate a cyber attack. Monitoring network traffic to dark IP address spaces can thus be used to identify such scanning, in an effort to predict which networks are being probed for vulnerabilities that may lead the networks to become compromised. Furthermore, monitoring network traffic to dark IP addresses can be used for other reasons as well, such as providing insights into the applications that malicious actors are looking for during such scanning.

Techniques for monitoring network traffic to dark IP address spaces, however, can suffer from various shortcomings. A given entity may collect all network traffic incoming to its dark IP address space in an attempt to detect and predict cyber attacks on the entity's network. However, this information is collected in isolation, without consideration of network traffic being routed to the IP address spaces of other entities, and therefore can be of limited value in predicting cyber attacks, especially due to a large number of false positives.

Techniques described herein ameliorate these shortcomings. Participating entities monitor incoming network traffic to their dark IP address spaces, such as to every IP address of their dark IP address spaces, and send information regarding this traffic to a centralized analysis service. The service can predict a cyber attack based on this rich set of information, and subsequently notify the entities that are likely to be affected by the predicted cyber attack. The techniques described herein thus provide for better cyber attack prediction than techniques that consider the dark IP address space of an individual entity's network in isolation or that consider a sensor-based sampling of the dark IP address spaces of multiple entities' networks.

Figure 1:
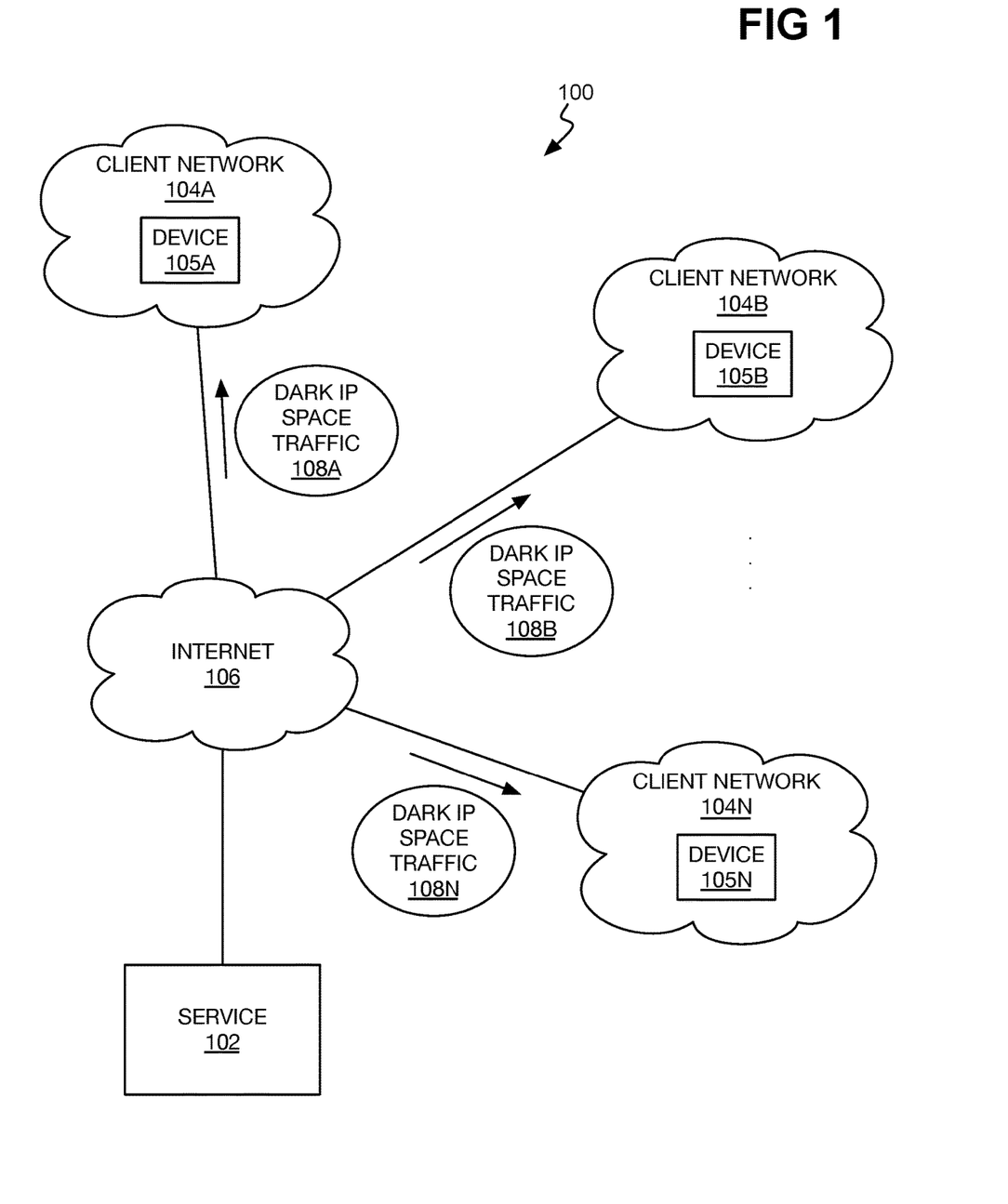
FIG. 1 is a diagram of an example topological architecture.

FIG. 1 shows an example architectural topology 100. A service provider operates a service 102. As used herein, the service 102 includes a combination of hardware and software, such as software running on one or more server computing devices. The service provider has a number of clients. For example, the clients may be entities like government organizations and corporations, including large enterprises. The service provider itself may be an entity like a corporation.

The clients have client networks 104A, 104B, . . . , 104N, collectively referred to as the client network 104. Each client has its own network 104. The network 104 of a client includes the client's internal network that interconnects the client's computing devices. As an example, the client networks 104A, 104B, . . . , 104N respectively include client computing devices, which can also be referred to as client devices, 105A, 105B, . . . , 105N, which are collectively referred to as the clients 105. The client devices 105 collect information on behalf of the service 102.

At least a part of each client network 104 is outward towards or externally faces the Internet 106. Therefore, the client networks 104 are communicatively connected to the Internet 106, and can receive incoming network traffic from the Internet 106, as well as send outgoing network traffic onto the Internet 106. The service 102 can also be communicatively connected to the Internet 106, or is otherwise communicatively connected to the client devices 105 of the client networks 104.

Each client network 104 receives incoming network traffic at the IP addresses of its corresponding IP address space, including its dark IP address space. That is, each client network 104 has a usable IP address space of publicy routable IP addresses that the corresponding client is currently using, as well as a dark IP address space of publicly routable IP addresses that the client in question is not currently using. Therefore, incoming dark IP address space network traffic 108A, 108B, . . . , 108N, collectively referred to as the dark IP address space network traffic 108, is respectively directed towards the client networks 104A, 104B, . . . , 104N. The client devices 105 collect the incoming dark IP address space network traffic 108 to their respective networks 104.

The incoming dark IP space network traffic 108 originates from other computing devices (i.e., other than the client devices 105) of other networks communicatively connected to the Internet 106. Such computing devices may be desktop or laptop computers, for instance, as well as other devices that have less computing capability, including Internet of Things (IoT) devices, smartphones, and so on. Such devices may be operated by rogue actors who are scanning routable IP addresses of the Internet 106, including the addresses of the dark IP address spaces of the client networks 104, in preparation of a cyber attack. Such scanning, for instance, may be performed to look for susceptible devices, applications, and services that can be compromised for takeover so that the devices can then be controlled to use as originators of cyber attacks like distributed denial-of-service (DDoS) attacks. Such scanning may be performed to look for susceptible devices, applications, and services that can be compromised as points of entry into their corresponding networks, such as the client networks 104.

Figure 2:
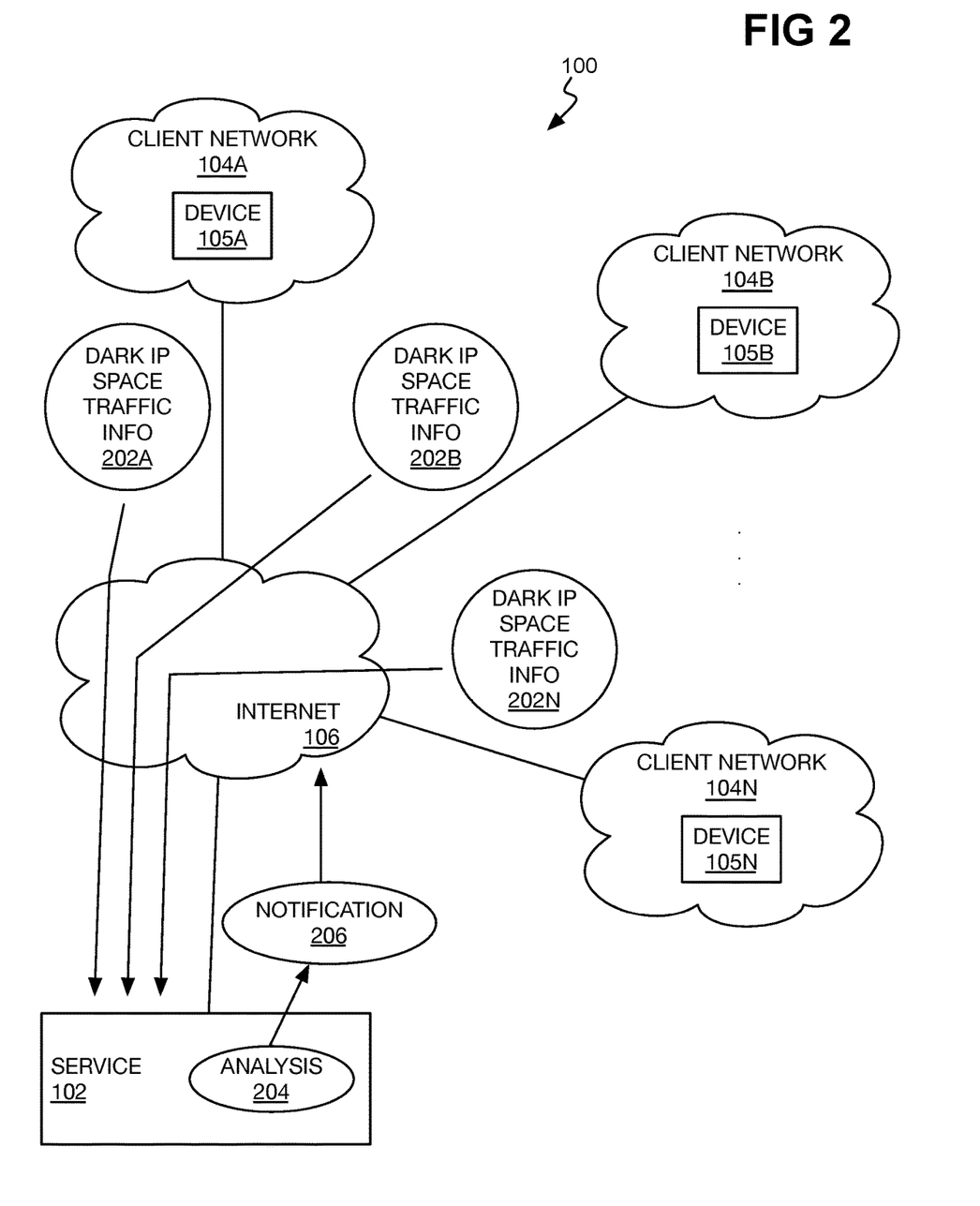
FIG. 2 is a diagram illustratively depicting an example as to how cyber attack prediction can be performed in the architectural topology of FIG. 1.

FIG. 2 illustratively depicts an example as to how cyber attack prediction can be performed in the architectural topology 100. The client devices 105A, 105B, . . . , 105N of their respective client networks 104A, 1046, . . . , 104N send dark IP address space traffic information 202A, 202B, . . . , 202N, collectively referred to as the dark IP address space traffic information 202, to the service 102. In the example of FIG. 2, the client devices 105 send the dark IP address space traffic information 202 over the Internet 106. However, the client devices 105 may send the information 202 over a network other than the Internet 106.

The dark IP address space traffic information 202 sent by a client device 105 of a client network 104 pertains to the incoming dark IP space network traffic 108 of FIG. 1 that was received at the client network 104 and collected by the client devices 105. In the example of FIG. 2, the information 202 is minimally processed. That is, while the information 202 may not be raw dark IP space network traffic 108 received at the client network 104, which may be too voluminous to relay to the service 102, the information 202 does not represent the results of any analysis performed at the client network 104 as to whether the network traffic 108 represents potential port, protocol, or other scanning that may be indicative of an imminent cyber attack.

As a concrete example, the client computing devices 105 may collect packet traces of dark IP address space network traffic 108, and then process the traces to generate a text log file that summarizes the activity. The log file may further transform the IP addresses in some manner, and the resulting log file is sent as the information 202. However, this information 202 does not represent any analysis performed as to whether the network traffic 108 is indicative of an imminent cyber attack.

As another example, the information 202 may include just the originating source IP addresses, the destination IP addresses, and destination ports of the network traffic 108, when the network traffic 108 was sent (i.e., timestamps of the data packets of this network traffic 108), the transport protocols of the data packets, and the number of data packets of such network traffic 108 originating from each source IP address by period of time. The information 202 may include other information regarding the network traffic 108 as well. The information 202 may be anonymized so that the identification of the client operating the client network 104 in question cannot be gleaned from the information 202.

It is noted that the dark IP address space traffic information 202 transmitted by a client computing device 105 to the service 102 can pertain to dark IP address space traffic 108 of FIG. 1 received at any dark IP address of the client operating the respective client network 104. That is, there may not just be scattershot sensors placed at the client networks 104 to sample the dark IP address space traffic received at the networks 104. Rather, the client networks 104 can themselves be configured to monitor all incoming dark IP address space traffic 108, such that the information 202 is with respect to all such traffic 108 received at the networks 104.

The dark IP address space traffic information 202 sent by the client devices 105 of the client networks 104 to the service 102 thus summarizes that the incoming dark IP address space traffic 108 of FIG. 1 that was received at the client networks 104 and collected by the client devices 105. The client devices 105 may, in addition to anonymizing the information 202, encrypt the information 202 prior to transmission to the service 102. From the information 202, the service 102 can identify the source IP addresses originating the dark IP space network traffic 108, as well as the frequency and amount of the traffic 108 incoming at each client network 104. While the information 202 is anonymized to prevent particular identification of the clients of the client network 104 from the information 202 itself, the service provider knows which client networks 104 (and thus which clients) received which traffic 108, at least because the service provider knows which client device 105 sent each dark IP address space traffic information 202.

The service 102 performs analysis 204 on the dark IP address space traffic information 202 received from the client devices 105 of the client networks 104. The analysis 204 can include performing statistical and other analyses on the information 202, to determine whether the information 202 portends a cyber attack (or, indeed, one or more such attacks). Such analysis can be performed as in the ArcSight Investigate solution, available from Micro Focus, of Newbury, England, UK, but with respect to the dark IP address space traffic 108 received at multiple client networks 104. As such, the service 102 can predict a cyber attack based on the information 202. Different types of analysis 204 in this respect are described later in the detailed description.

After performing the analysis 204, then, the service 102 may send a notification 206 just to the client computing device 105 of each client network 104 that may be affected by the predicted cyber attack. That is, a client computing device 105 may not receive such notification 206 unless its client network 104 may be affected by the predicted cyber attack. The client devices 105 receiving the notification 206 can in turn institute countermeasures at their respective client networks 104 to minimize success of the predicted cyber attack. Such countermeasures may include reconfiguring the networks 104, reconfiguring devices on the networks 104, and so on.

In other implementations, other client networks 104 may be informed of the predicted cyber attack, even though they have not been predicted as being targeted by the cyber attack. In this respect, the client networks 104 that are being targeted by the cyber attack may receive higher priority notification 206 than the networks 104 that are not being specifically targeted. Furthermore, as described in detail below, a client network 104 may be considered as being affected by a predicted cyber attack if it is unwittingly the source of the cyber attack.

In the example of FIG. 2, the collection of the minimally processed dark IP space traffic information 202 is decentralized over the client devices 105 of the client networks 104. However, the analysis of this information 204 is centralized at the service 102. In other implementations, the analysis itself may be split between the client devices 105 of the client networks 104 and the service 102.

Figure 3:
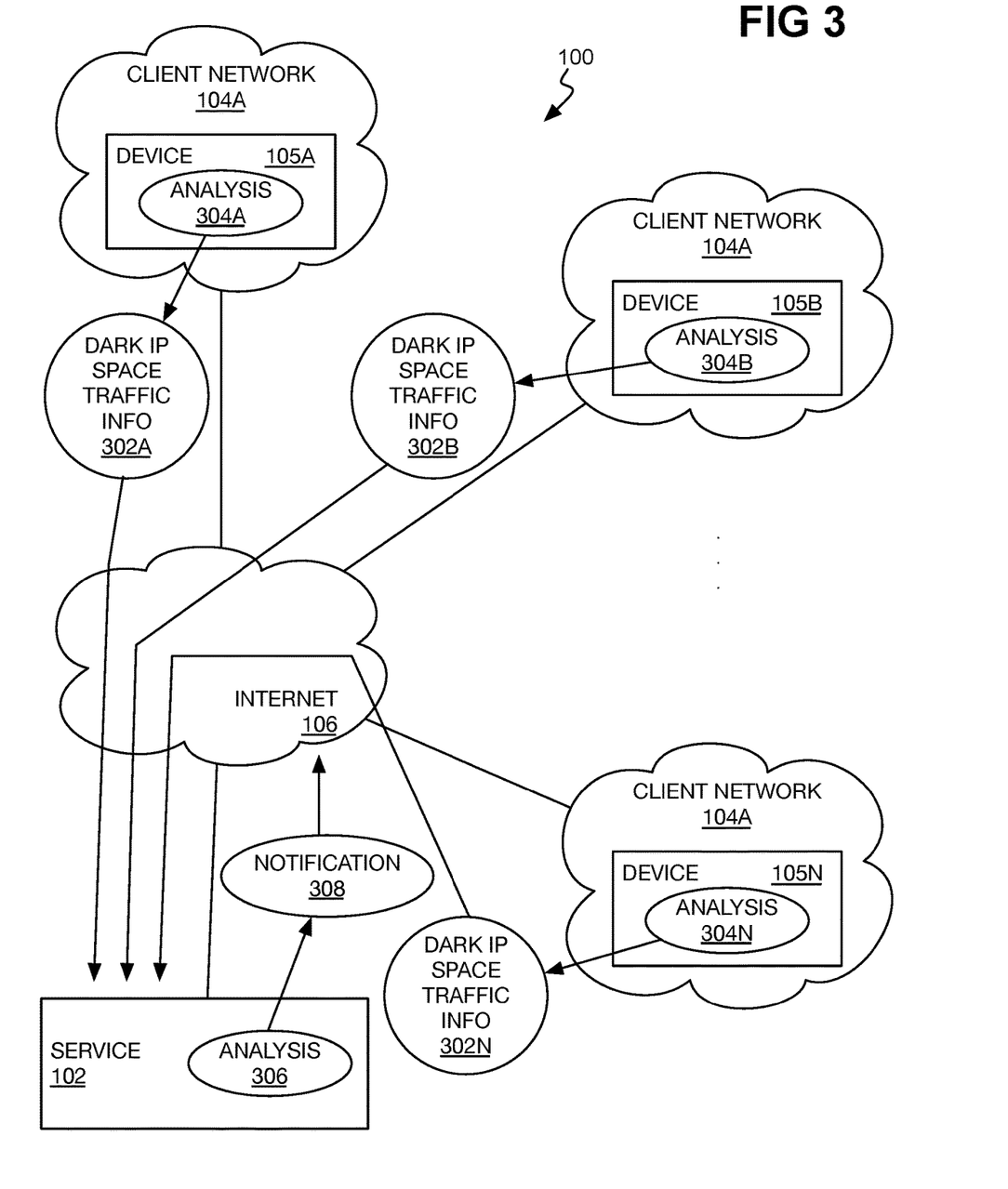
FIG. 3 is a diagram illustratively depicting another example as to how cyber attack prediction can be performed in the architectural topology of FIG. 1.

For instance, FIG. 3 illustratively depicts such an example as to how cyber attack prediction can be performed in the architectural topology 100.

The client devices 105A, 105B, . . . , 105N of their respective client networks 104A, 104B, . . . , 104N still send dark IP address space traffic information 302A, 302B, . . . , 302N, collectively referred to as the dark IP address space traffic information 302, to the service 102. As in FIG. 2, in the example of FIG. 3 the client devices 105 send the dark IP address space traffic information 302 over the Internet 106, but may send the information 302 over a network other than the Internet 106.

The dark IP address space traffic information 302 sent by a client device 105 of a client network 104 pertains to the incoming dark IP space network traffic 108 of FIG. 1 that was received at the client network 104, as in FIG. 2. However, in the example of FIG. 3, the information 302 is processed information. That is, the information 302 is processed information in that it represents the results of initial or preliminary analysis performed by the client device 105 of the client network 104 in question, such as to whether the network traffic 108 represents potential port or other scanning that may be indicative of an imminent cyber attack. The client device 105 performs this preliminary analysis based just on the incoming dark IP space network traffic 108 at its own client network 104, and not based on the network traffic 108 at any other client network 104. The information 302 may be anonymized and/or encrypted prior to transmission.

While the dark IP address space traffic information 302 transmitted by a client device 105 to the service 102 represents initial analysis results regarding incoming dark IP space network traffic 108 of FIG. 1 received at the client network 104 of this device 105, the information 302 still reflects such traffic 108 received at any dark IP address of the client operating the network 104. That is, as in FIG. 2, there are not scattershot sensors placed at the client networks 104 to sample the dark IP address space traffic received at the networks 104. Rather, the client networks 104 themselves can be configured to monitor all incoming dark IP address space traffic 108, such that the information 302 reflects initial processing results with respect to all such traffic 108 received at the networks 104.

The dark IP address space traffic information 302 sent by the client devices 105 of the client networks 104 to the service 102 is thus more than a summarization of the incoming dark IP address space traffic 108 of FIG. 1 that was received at the client network 104. The information 302 still does not reflect full and complete analysis results of the information 302, if only because the dark IP address space traffic information 302 sent by any given client device 105 results from processing performed on the traffic 108 at one client network 104, and not at multiple networks 104.

To the extent that the dark IP address space traffic information 302 sent by a client device 105 indicates that the respective client network 104 is receive incoming traffic 108 potentially indicative of an imminent cyber attack, however, the device 105 may in FIG. 3 provide as part of the information 302 a summarization of the traffic 108 as in FIG. 2. That is, the initial processing that the client device 105 may be used to assist the service 102 in prioritizing its own processing of the information 302 received from the client devices 105. In other implementations, to the extent that the processing of the network traffic 108 at all client networks 104 to predict an imminent cyber attack can be divided between processing that pertains to the network traffic 108 at an individual client network 104 and processing that pertains to the traffic 108 at multiple client networks 108, the processing the client devices 105 themselves perform is the former processing.

The service 102 thus performs further analysis 306 on the dark IP address space traffic information 302 received from the client devices 105 of the client networks 104. The analysis 306 can perform statistical and other analyses on the information 302, correlating the initial analysis results that the client devices 105 themselves performed to determine whether the information 302 portends a cyber attack. Such analysis can be performed as in the ArcSight Investigate solution noted above, which in turn may rely in this respect upon Vertica database software also available from Micro Focus, but with respect to the dark IP address space traffic 108 received at multiple client networks 104. As such, using the initial processing results provided as the information 302 from the client networks 104, the service 102 can predict a cyber attack based on this information 302. Different types of analysis 306 in this respect are described later in the detailed description.

After performing the analysis 306, the service 102 may send a notification 308 to the client device 105 of each client network 104 that may be affected by the predicted client network, and in some implementations, may send a notification 308 to the client devices 105 of the client networks 104 that are predicted as being currently affected by the cyber attack. As in FIG. 2, a client computing device 105 does not receive such notification 308 in FIG. 3 unless its client network 104 may be affected by the predicted cyber attack. Also as in FIG. 2, the client devices 105 receiving the notification 308 in FIG. 3 can responsively institute countermeasures at their respective client networks 104 to minimize success of the predicted cyber attacks.

In the example of FIG. 3, the analysis of the incoming dark IP address space traffic 108 of FIG. 1 is decentralized over the client devices 105 of the client networks 104. The results of this analysis are part of the dark IP space traffic information 302 that the client devices 105 of the client networks 104 send to the service 102. The service 102 in turn performs further analysis to predict the cyber attack. In the example of FIG. 3, then, some of the processing that the service 102 has to perform in the example of FIG. 2 may be offloaded onto the client devices 105.

Figure 4:
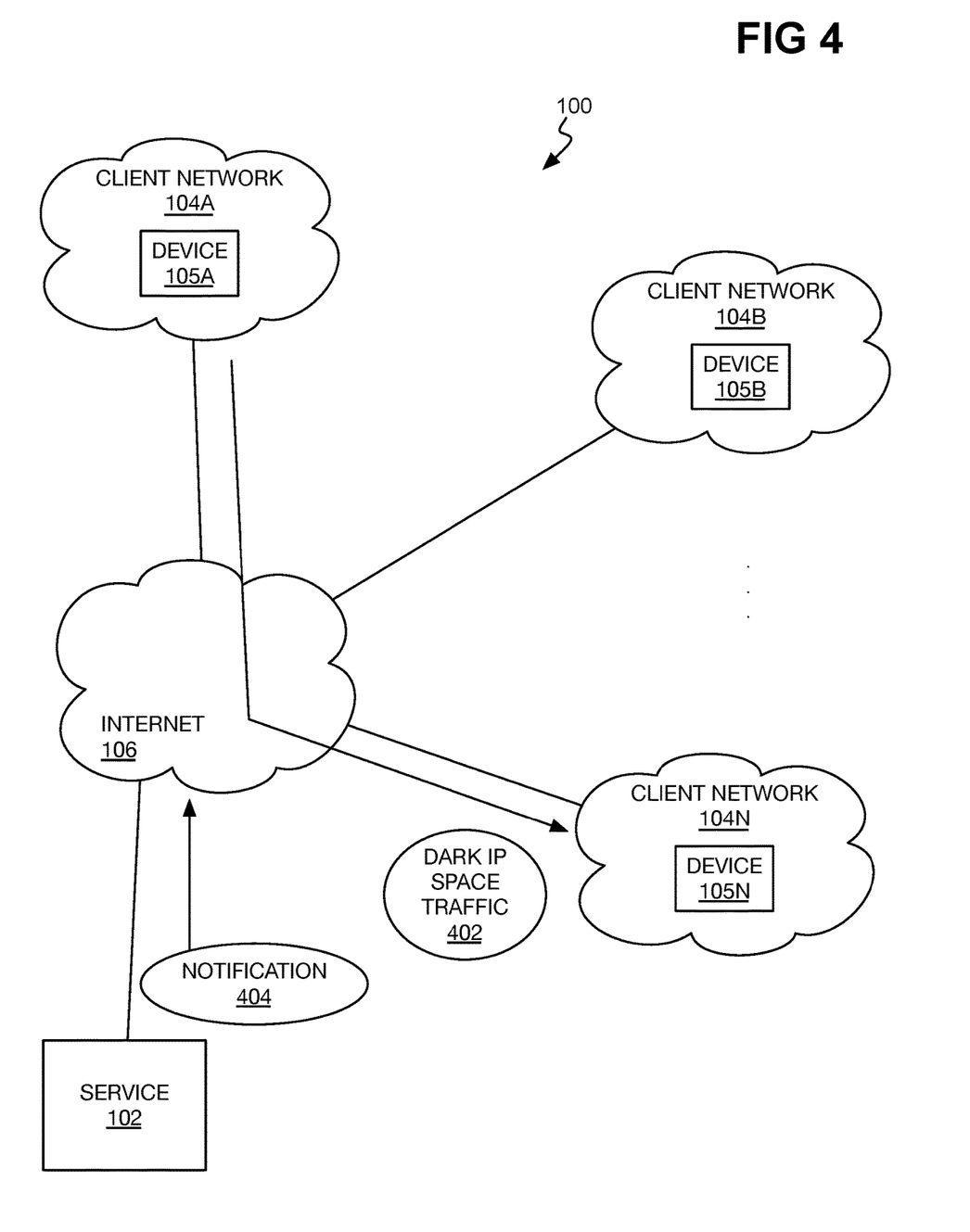
FIG. 4 is a diagram illustratively depicting a first example of a cyber attack that can be predicted in relation to FIGS. 2 and 3.

FIG. 4 illustratively depicts a first example of a cyber attack that the service 102 can predict from the dark IP address space traffic information provided by the client devices 105 of the client networks 104 within the topology 100. In the example of FIG. 4, the incoming dark IP address space network traffic 402 transmitted through the Internet 106 and received at the client network 104N originates from the client network 104A. Therefore, when the client computing device 105N of the client network 104N provides dark IP space traffic information, as in FIG. 2 or 3, the service 102 can recognize that the source IP address of the dark IP space network traffic 402 is an address assigned to the client network 104A.

The entities operating the client networks 104 are clients of the service provider operating the service 102. This means that by collecting information regarding dark IP address space network traffic at the client networks 104, the service 102 is able to identify that the client network 104A of one client of the service provider, the entity operating the client network 104A, is the source of the scanning of the dark IP address space of another client of the service provider, the entity operating the client network 104N. (Furthermore, if the source of the dark IP address space scanning is not a current client of the service provider, but is believed to be a reputable organization or other entity, the service provider can use this information in attempt to attract the organization to become a client.) As such, collecting dark IP address space network traffic information from multiple clients permits the service 102 to make such a cyber attack prediction, where otherwise the prediction may not be possible.

In response, the service 102 can provide a notification 404 to both the client device 105A at the client network 104A and the client device 105N at the client network 104N, on a point-to-point basis (i.e., the entity operating the client network 104A may be the only entity that is informed that it is unwittingly participating in malicious activity, to avoid embarrassing the entity). The notification 404 that the client device 105N receives can inform the device 105N that the client network 104N may become the subject of a cyber attack—but that the service provider is in the process of mitigating the likelihood that the attack will actually occur. (Other client networks 104 may also be informed, but at a different prioritization level, however, as noted above.) By comparison the notification that the client device 105A receives can inform the client device 105A that a computing device on its client network 104A is sending dark IP address space network traffic.

The client device 105A therefore can institute an appropriate countermeasure at the client network 104A based on this information. As one example, the client network 104A may be misconfigured, which is causing the network 104A to unknowingly be the source of the dark IP address space network traffic (i.e., the predicted cyber attack). Therefore, the countermeasure can involve correcting the misconfiguration so that dark IP address space network traffic no longer originates at the client network 104A.

As another example, a malicious actor may have infiltrated the client network 104A, taking over a device at the client network 104A and causing the device to send dark IP address network traffic. For instance, the computing device may later participate in a DDoS attack on the client network 104N. The countermeasure can involve detecting which device has been infiltrated, and removing the malware that has infected this device.

In either case, without the service 102 collecting dark IP address space network traffic information from the computing devices 105 of multiple client networks 104, such cyber attacks may not have been able to be predicted with the same level of identifying specificity as to the origination of the attacks. Even in the more benign case in which the client network 104A is simply misconfigured, the collection of dark IP space traffic information regarding multiple client networks 104 permits the computing device 105A to resolve a network misconfiguration that may otherwise have gone undetected. For instance, the entity operating the client network 104A may believe that the network traffic in question is legitimate network traffic that is not receiving responses because of technical issues at the client network 104N.

In the more malicious case in which the client network 104A has been infiltrated by a rogue actor, the collection of dark IP space traffic information regarding multiple client networks 104 can prevent a predicted cyber attack from occurring more definitively than if such information were not collected from multiple networks 104. It is noted in this respect that if the dark IP space network traffic outgoing from the client network 104A is to more than one client network 104, than there is a greater likelihood that the network 104A has been infiltrated by a rogue actor. That is, a misconfiguration at the client network 104A without malicious intent is unlikely to result in dark IP space network traffic being sent to a large number of the other client networks 104.

Figure 5:
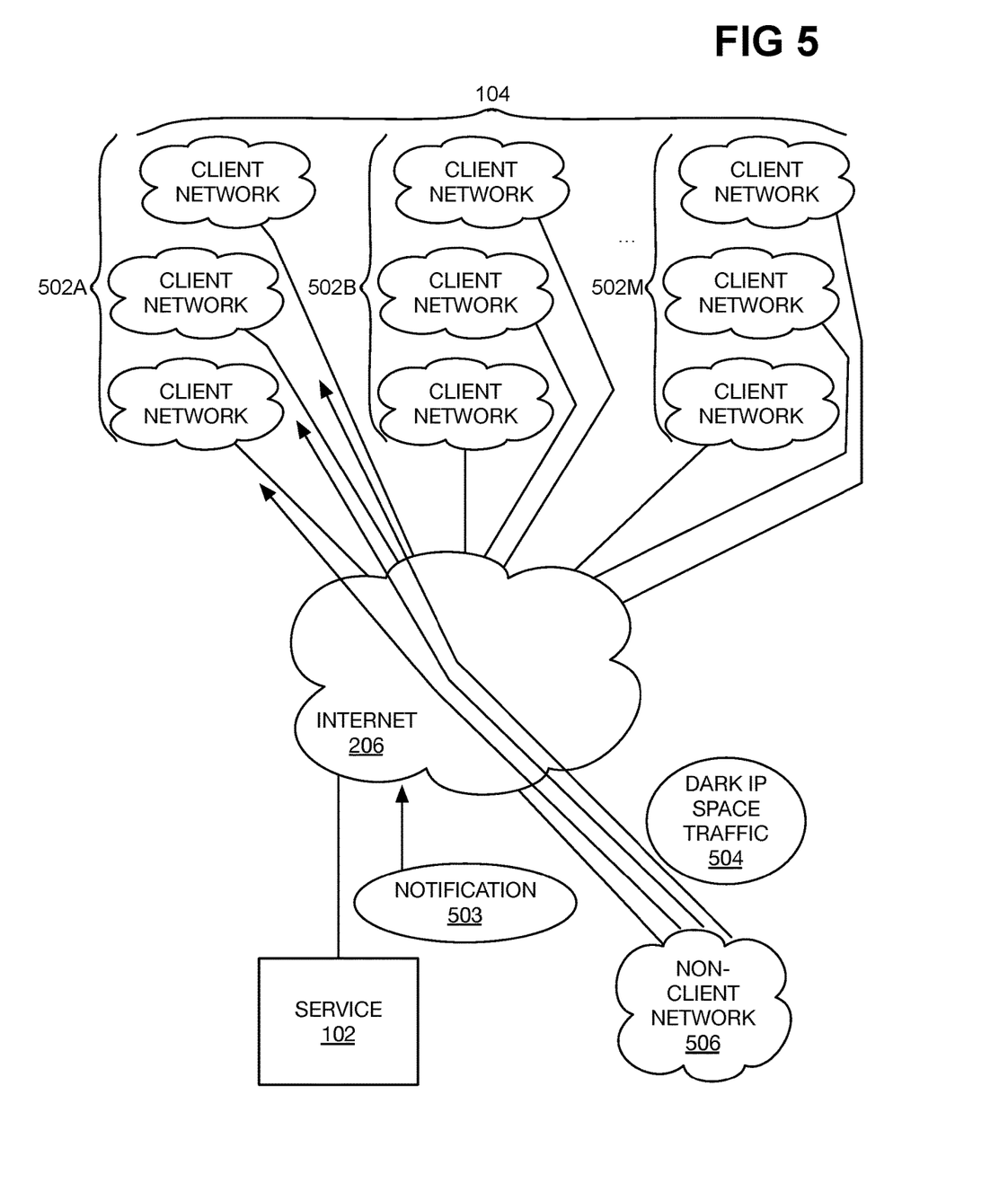
FIG. 5 is a diagram illustratively depicting a second example of a cyber attack that can be predicted in relation to FIGS. 2 and 3.

FIG. 5 illustratively depicts a second example of a cyber attack that the service 102 can predict from the dark IP address space traffic information provided by the client devices 105 of the client networks 104 within the topology 100. In the example of FIG. 5, the client networks 104 are divided over groups 502A, 502B, . . . , 502M, collectively referred to as the client network groups 502. The client networks 104 of a given group 502 share a common characteristic. For instance, the groups 502 may correspond to entities of different industrial sectors.

To provide a concrete example, the group 502A may include the client networks 104 of clients of the service provider that are in the banking sector, whereas the group 502B may include the client networks 104 of clients of the service provider that are in the entertainment industry. The group 502M may include the client networks 104 of clients of the service provider that are in the defense industry. The client networks 104 may be divided into groups 502 according to common characteristics other than the industrial sectors to which the entities operating the networks 104 belong.

In the example of FIG. 5, the incoming dark IP address space network traffic 504 originates from a non-client network 506 (i.e., not from a network 502 of the provider of the service 102) and transmitted through the Internet 106 and received at the client networks 104 portends a possible cyber attack just on client networks 104 having the common characteristic to which the group 502A corresponds. For instance, the client networks 104 of the other groups 502 may not be currently receiving dark IP address space network traffic, or they may be receiving at a much less methodical level than the client networks 104 of the group 502A. Therefore, when the client computing devices 105 of the client networks 104 provide dark IP space traffic information, as in FIG. 2 or 3, the service 102 can recognize that the client networks 104 receiving the dark IP space traffic 402 all have a characteristic in common—that to which the group 502A corresponds.

By collecting information regarding dark IP address space network traffic at multiple client networks 104, the service 102 is able to predict cyber attacks that otherwise may not be able to be predicted. For instance, in the concrete example in which the client networks 104 within the group 502A are operated by entities in the banking sector, the service 102 can predict that banks in particular are vulnerable to an imminent cyber attack. If the service 102 did not receive dark IP address space network traffic from multiple client networks 104, the characteristic that is the reason why each client network 104 of the group 502A is being targeted for a cyber attack may not otherwise be able to be identified. (In this respect, it is noted that the service 102 is distinguishing among relatively random cyber attacks against any IP address space, targeted cyber attacks against the networks 104 of a particular group 502, and target cyber attacks against a particular network 104.)

In response, the service 102 can provide a notification 503 to the client device 105 of every client network 104 within the group 502. The notification 503 can inform each such client device 105 that its corresponding client network 104 may be subjected to a cyber attack due to the nature of the industrial sector of the entity operating the network 104. The notification 503 can even be sent to client devices 105 of client networks 104 within the group 502 that did not receive dark IP address space traffic 504 portending an imminent cyber attack. That is, the client device 105 of such a client network 104 may receive a notification 503 that while the dark IP address space traffic 504 at the network 104 is not indicative of an imminent cyber attack, the entity operating this network 104 has the same characteristic as other client networks 104 for which a cyber attack does appear to be imminent, and appropriate precautions should be made. The notifications can further be shared with clients of the provider of the service 102 that do not participate in the collection of dark IP address space network traffic.

The client networks 104 of the other groups 502 may also receive notifications, but at lower priority. Thus, in the example of FIG. 5, the client networks 104 of the group 502A that actually received dark IP address space network traffic 504 may receive the highest priority notifications 503. The other client networks 104 of the group 502 that did not receive the network traffic 504 may receive slightly lower—but still high—priority notifications 503. The client networks 104 of the other groups 520 therefore receive the lowest priority notifications in this specific implementation.

The client devices 105 of the client networks 104 within the group 502A therefore can institute appropriate countermeasures at the networks 104 based on this information. The client networks 104 in question may have their configurations hardened to reduce the likelihood that they will be harmed by a cyber attack, even if such hardening means that network performance is temporarily degraded. The client networks 104 may be monitored more carefully to ensure that a cyber attack is quickly detected if and when it occurs. The countermeasures that are instituted can thus be gauged with the knowledge that the client networks 104 within the group 502A have been predicted as being the target of a cyber attack due to their common characteristic. That is, deciding which countermeasures are taken can be based on this knowledge, which may not be available if the service 102 were not collecting dark IP address space network traffic information from multiple client networks 104.

Figure 6:
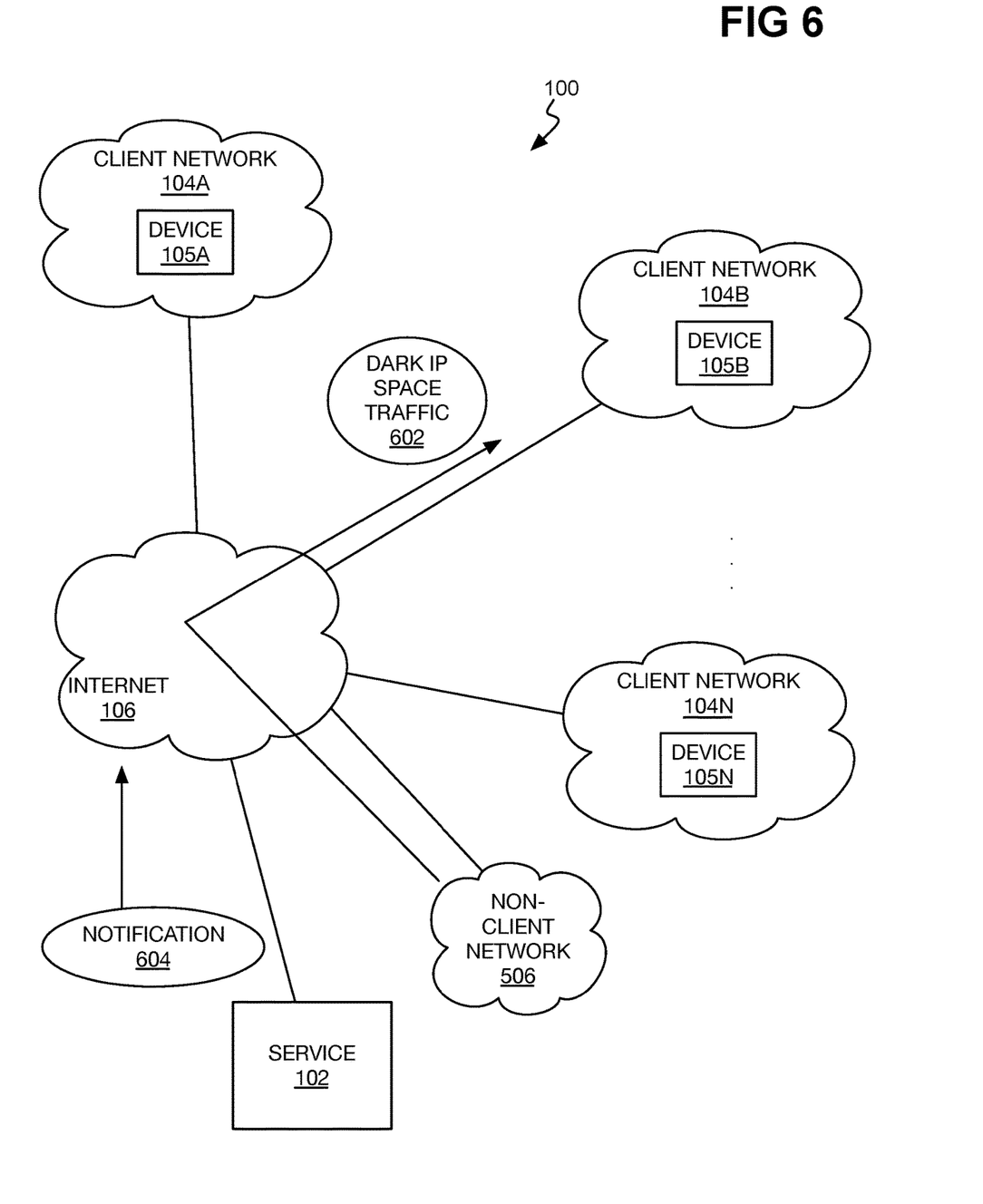
FIG. 6 is a diagram illustratively depicting a third example of a cyber attack that can be predicted in relation to FIGS. 2 and 3.

FIG. 6 illustratively depicts a third example of a cyber attack that the service 102 can predict from the dark IP address space traffic information provided by the client devices 105 of the client networks 104 within the topology 100. In the example of FIG. 6, the incoming dark IP address space network traffic 602 originating from a non-client network 506 (i.e., not from a network 502 of the provider of the service 102) and transmitted through the Internet 106 and received at the client network 104B portends a possible cyber attack targeting just the client network 104B. For instance, the other client networks 104 may not be currently receiving dark IP address space network traffic, or they may be receiving much less such traffic than the client network 104B. Therefore, when the client computing devices 105 of the client networks 104 provide dark IP space traffic information, as in FIG. 2 or 3, the service 102 can recognize that client network 104B is being individually targeted for an imminent cyber attack.

By collecting information regarding dark IP address space network traffic at multiple client networks 104, therefore, the service 102 may be able to assess the threat level of a cyber attack, which otherwise may not be possible. For instance, that just one client network 104B is the target of a potential cyber attack may indicate a higher threat level than if more than one client network 104 were potentially targeted. This is because the nefarious attacker originating the dark IP address space network traffic 602 may be focusing all its resources against the client network 104B, as opposed to dividing its capabilities over multiple client networks 104. If the service 102 did not receive dark IP address space network traffic from multiple client networks 104, then, the level of seriousness at which the predicted cyber attack is treated at the client network 104B may not be as high.

The service 102 can thus provide a notification 604 to the client device 105B of the client network 104B. The notification 604 informs the client device 105B that its client network 104B may be being exclusively targeted for an imminent cyber attack. The client device 105B can therefore institute an appropriate countermeasure at the client network 104B, based on the information that it appears the resources of a nefarious actor are being focused on just the network 104B. To the extent that different countermeasures have varying degrees of cost, including performance degradation, the knowledge that the client network 104B may be receiving the undivided attention of a malicious actor can result in a higher-cost but more effective countermeasure being taken. This is a decision that may not have been made if the service 102 were not collecting dark IP address space network traffic information from multiple client networks 104.

Figure 7:
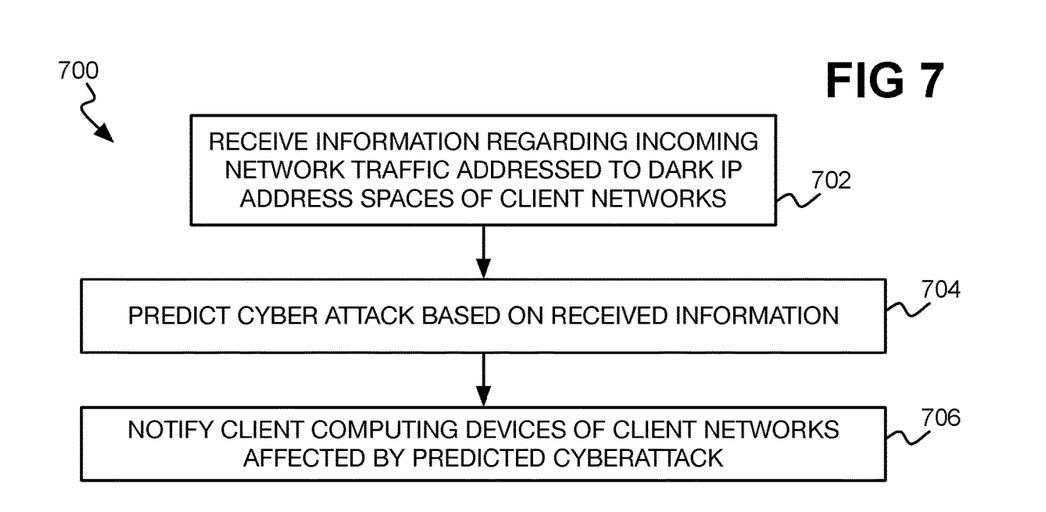
FIG. 7 is a flowchart of an example method.

FIG. 7 shows an example method 700. The service 102 can perform the method 700. For example, the method 700 may be implemented as program code stored on a non-transitory computer-readable data storage medium. A processor of the service 102 executes the code to perform the method 700.

The method 700 includes receiving information regarding incoming network traffic 108 addressed to the address spaces of client networks 104, from client devices 105 of the client networks (702), as has been described above in relation to FIGS. 2 and 3. The method 700 includes predicting a cyber attack based on the received information (704), examples of which have been described above in relation to FIGS. 4-6. The method 700 concludes with notifying the client computing device 105 of each client network 104 affected by the predicted cyber attack (706). As noted above, the client computing devices 105 of the other client networks 104 may also be notified, but at lesser priority.

Figure 8:
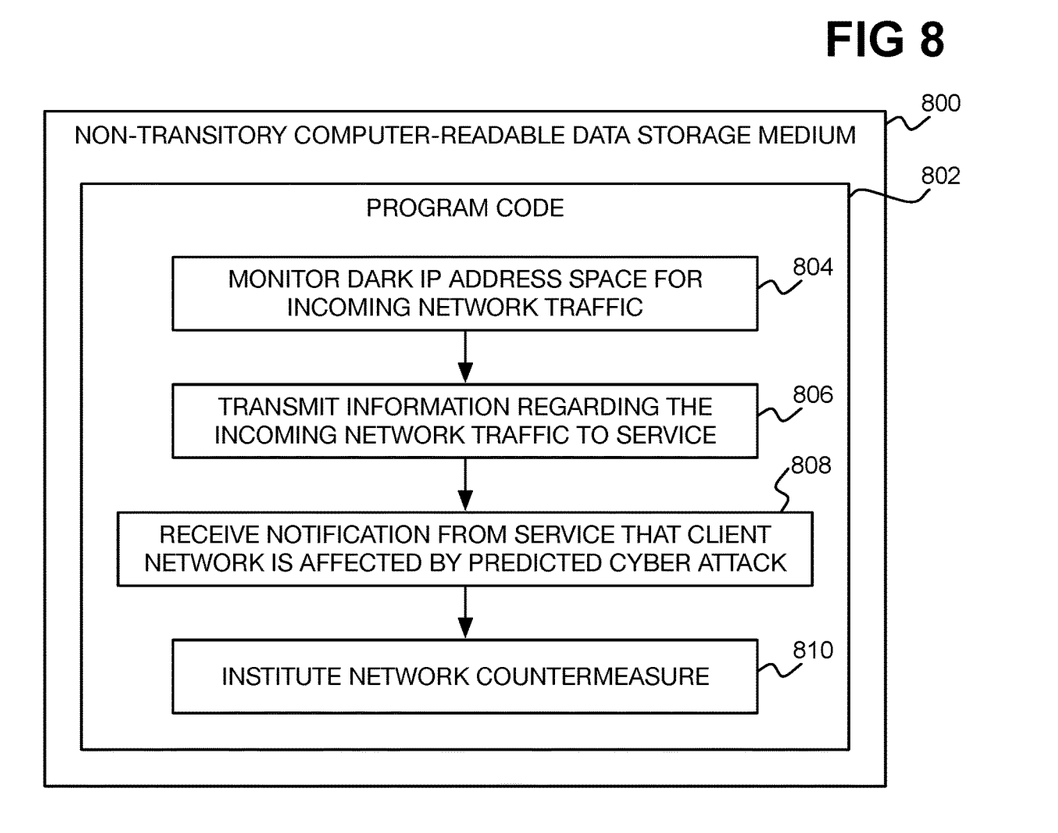
FIG. 8 is a diagram of an example non-transitory computer-readable data storage medium.

FIG. 8 shows an example non-transitory computer-readable data storage medium 800. The medium 800 stores program code 802. A client device 105 of each client network 104 may execute the program code 802. For example, a processor of the client device 105 of each client network 104 may execute the program code 802.

Execution of the program code by a client device 105 of a client network 104 causes the client device 105 to monitor a dark IP address space of the client network 104 for incoming network traffic 108 addressed to the dark IP address space (804), as has been described above in relation to FIG. 1. Execution of the program code causes the client device 105 to send information regarding this incoming network traffic 108 to a service 102 (806), as has been described above in relation to FIGS. 2 and 3. Execution of the program code results in the client device 105 receiving a notification from the service 102 that the client network 104 is affected by a predicted cyber attack (808), and in the institution of a corresponding countermeasure to minimize success of the predicted attack (810), examples of which have been described above in relation to FIGS. 4-6.

Figure 9:
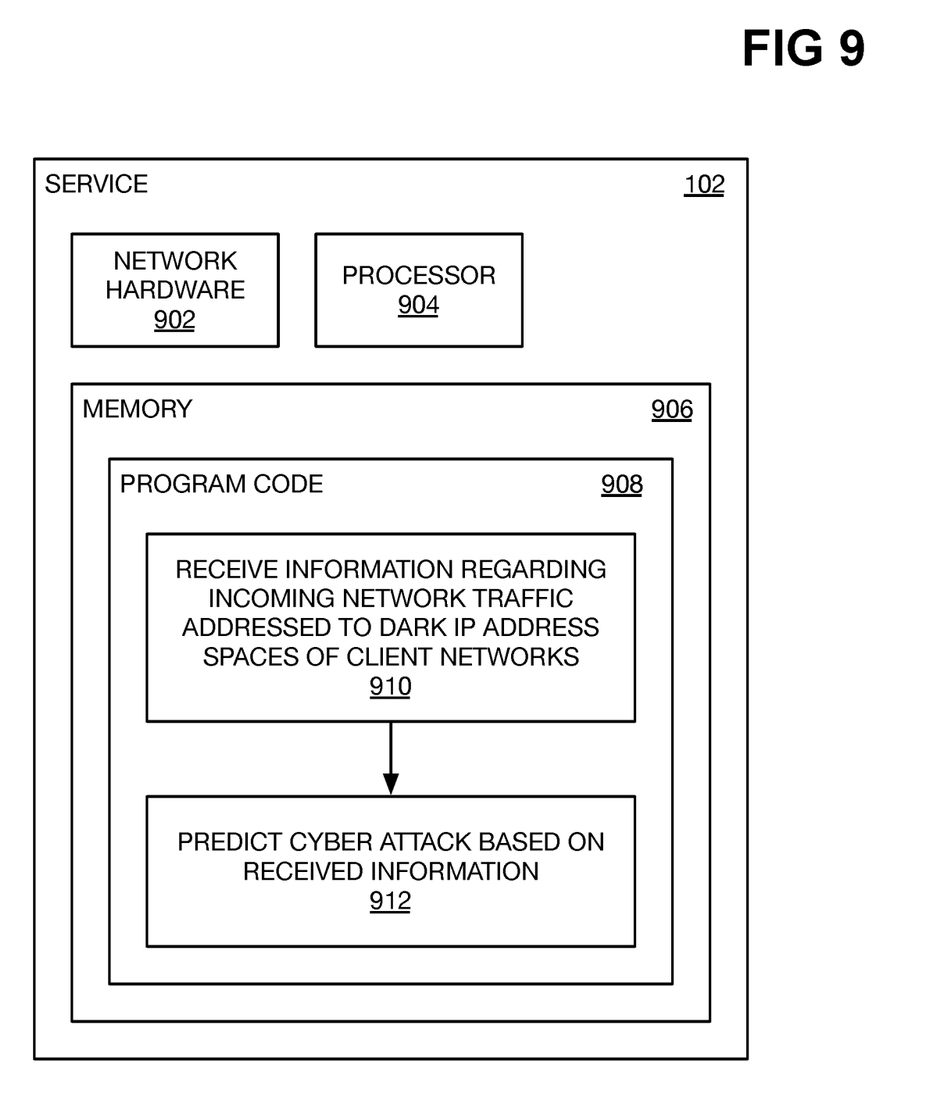
FIG. 9 is a diagram of an example system.

FIG. 9 shows an example of the service 102. The service 102 includes network hardware 902, a processor 904, and memory 906 that stores program code 908. The service 102 can include other hardware components in addition to those depicted in FIG. 9. The network hardware 902, the processor 904, the memory 906, and the other hardware components of the service 102 can be disposed over one or more server computing devices, for instance.

The network hardware 902 communicatively connects the service 102 to the client networks 104. The processor 904 executes the program code 908 to receive information regarding incoming network traffic addressed to the dark IP address spaces of the client networks 104 (910), as has been described above in relation to FIGS. 2 and 3. The processor 904 executes the program code 908 to predict a cyber attack based on the received information (912), examples of which have been described above in relation to FIGS. 4-6.

The techniques described herein thus collect information regarding dark IP address spaces from multiple client networks. These techniques leverage the fact that the information is being received from multiple such client networks to predict cyber attacks. The cyber attacks that are predicted may otherwise be unable to be predicted based on the incoming network traffic addressed to the dark IP address space of any one individual client network. The information that is received from multiple client networks can also be leveraged in other ways. For instance, with a historical set of such information, trends can be detected in the evolution of cyber attacks, and such information may periodically shared with the clients of the server provider.

We claim:

1. A method comprising:
   receiving, by a service, information regarding incoming network traffic addressed to dark Internet Protocol (IP) address spaces of a plurality of client networks, from client computing devices of the client networks;
   predicting, by the service, a cyber attack based on the information received from the client computing devices of the client networks, including determining that the client networks that are receiving the incoming network traffic addressed to the dark IP address spaces thereof share a common characteristic in that the client networks belong to entities of a same industrial sector, the cyber attack unable to be predicted based on the incoming network traffic addressed to the dark IP address space of any one of the client networks; and
   notifying, by the service, the client computing device of each client network sharing the common characteristic that the cyber attack is targeting the clients sharing the common characteristic.

2. The method of claim 1, wherein the service notifies the client computing device of each client network sharing the common characteristic to institute network countermeasures.

3. The method of claim 1, wherein each client network comprises an IP address space, including an in-use IP address space of in-use routable IP addresses and the dark IP address space of unused routable IP addresses.

4. The method of claim 3, wherein the service receives, from the client computing device of each client network, the information regarding the incoming network traffic addressed to any unused routable IP address of the dark IP address space of the IP address space of the client network.

5. The method of claim 1, wherein the information comprises minimally unprocessed information regarding the network traffic addressed to the dark IP address spaces of the client networks,
   and wherein analysis of the minimally unprocessed information is centralized at the service, and collection of the minimally unprocessed information is decentralized over the client computing devices of the client networks.

6. The method of claim 1, wherein the information comprises processed information regarding the network traffic addressed to the dark IP address spaces of the client networks,
   and wherein analysis resulting in generation of the processed information is decentralized over the client computing devices of the client networks, further analysis being performed at the service to predict the cyber attack.

7. The method of claim 1, wherein the information is anonymized at the client networks prior to transmission to the service.

8. The method of claim 2, wherein the network countermeasures are to minimize success of the predicted cyber attack.

9. A non-transitory computer-readable data storage medium storing program code executable by a computing device of a client network to:
   monitor a dark IP address space of the client network for incoming network traffic addressed to the dark IP address space of the client network;
   transmit information regarding the incoming network traffic addressed to the dark IP address space to a service receiving information regarding incoming network traffic addressed to other dark IP address spaces of other client networks;
   receive a notification from the service, the notification comprising an indication that the client network is a source of a cyber attack, a target of the cyber network being one of the other client networks; and
   institute a network countermeasure at the client network to correct a misconfiguration of the client network that caused the client network to be the source of the cyber attack.

10. The non-transitory computer-readable data storage medium of claim 9, wherein the program code is executable by the computing device of the client network to further:

collect the incoming network traffic addressed to the dark IP address space of the client network, wherein the information regarding the incoming network traffic addressed to the dark IP address space transmitted to the service comprises the collected incoming network traffic with minimal processing at the client network.

11. The non-transitory computer-readable data storage medium of claim 9, wherein the program code is executable by the computing device of the client network to further:

perform preliminary analysis on the incoming network traffic addressed to the dark IP address space of the client network, wherein the information regarding the incoming network traffic addressed to the dark IP address space transmitted to the service comprises result of the performed preliminary analysis.

12. The non-transitory computer-readable data storage medium of claim 9, wherein the client network comprises an IP address space, including an in-use IP address space of in-use routable IP addresses and the dark IP address space of unused routable IP addresses.

13. The non-transitory computer-readable data storage medium of claim 9, wherein the program code is executable by the computing device to further anonymize the information prior to transmission to the service.

14. The non-transitory computer-readable data storage medium of claim 9, wherein the cyber attack is unable to be predicted based on the incoming network traffic addressed to the dark IP address space of any one of the client networks.

15. A computing device comprising:

network hardware to communicatively connect to a plurality of client computing devices of a respective plurality of client networks;

a processor;

a memory storing program code that the processor is to execute to:

receive information regarding incoming network traffic addressed to dark IP address spaces of the client networks, from the client computing devices;

predict a cyber attack based on the received information, including determining that the client networks that are receiving the incoming network traffic addressed to the dark IP address spaces thereof share a common characteristic in that the client networks belong to entities of a same industrial sector, the cyber attack unable to be predicted based on the incoming network traffic addressed to the dark IP address space of any one of the client networks; and notify the client computing device of each client network sharing the common characteristic that the cyber attack is targeting the clients sharing the common characteristic.

16. The computing device of claim 15, wherein the information comprises minimally unprocessed information regarding the network traffic addressed to the dark IP address spaces of the client networks, and wherein collection of the minimally unprocessed information is decentralized over the client computing devices of the client networks.

17. The computing device of claim 15, wherein each client network comprises an IP address space, including an in-use IP address space of in-use routable IP addresses and the dark IP address space of unused routable IP addresses.

18. The computing device of claim 17, wherein the processor is to execute the program code to further receive, from the client computing device of each client network, the information regarding the incoming network traffic addressed to any unused routable IP address of the dark IP address space of the IP address space of the client network.

19. The computing device of claim 15, wherein the processor is to execute the program code to further notify the client computing device of each client network sharing the common characteristic to institute network countermeasures.

20. The computing device of claim 19, wherein the network countermeasures are to minimize success of the predicted cyber attack.

* * * * *